(12) United States Patent
Huang et al.

(10) Patent No.: US 7,892,667 B2
(45) Date of Patent: Feb. 22, 2011

(54) BATTERY SECURITY DEVICE

(75) Inventors: Yu-Cheng Huang, Hsinchu (TW); Tzu-Chih Lin, Hsinchu (TW)

(73) Assignee: Altek Corporation, Hsinchu (TW)

( * ) Notice: Subject to any disclaimer, the term of this patent is extended or adjusted under 35 U.S.C. 154(b) by 879 days.

(21) Appl. No.: 11/519,901

(22) Filed: Sep. 13, 2006

(65) Prior Publication Data
US 2008/0063926 A1    Mar. 13, 2008

(51) Int. Cl.
*H01M 2/10* (2006.01)
(52) U.S. Cl. .................. 429/96; 429/99; 429/100; 429/163; 439/862
(58) Field of Classification Search .......... 429/96–100, 429/163–187; 439/856–862, 500
See application file for complete search history.

(56) References Cited
U.S. PATENT DOCUMENTS

| | | | | |
|---|---|---|---|---|
| 3,629,793 A | * | 12/1971 | Ettischer et al. ............. | 439/144 |
| 5,007,859 A | * | 4/1991 | Sangregory et al. ......... | 439/500 |
| 5,270,702 A | * | 12/1993 | Krolak ...................... | 340/7.63 |
| 5,931,693 A | * | 8/1999 | Yamazaki ................... | 439/500 |
| 2003/0152826 A1 | * | 8/2003 | Matsuzawa ................. | 429/100 |
| 2004/0053120 A1 | * | 3/2004 | Lee et al. ..................... | 429/97 |
| 2004/0224221 A1 | * | 11/2004 | Chen et al. ................... | 429/96 |
| 2005/0002154 A1 | * | 1/2005 | Nishiwaki ................... | 361/679 |

* cited by examiner

*Primary Examiner*—Basia Ridley
*Assistant Examiner*—Jacob Buchanan
(74) *Attorney, Agent, or Firm*—Rosenberg, Klein & Lee

(57) ABSTRACT

A battery security device includes a holder, a cover and at least one flexible plate. The holder contains the battery. The cover slips to set on the holder and has at least one raised lump to press the flexible plate. The flexible plate is set between the holder and the cover and has at least one elastic arm. The elastic arm has a stressed portion and at least one contact portion. When the cover slips to set on the holder, the raised lump presses down the stressed portion to increase the pressure of the elastic arm for avoiding power failure caused of the battery be shook. Further the device to fix a battery does not increase the force of setting the cover and not need any other component. To sum up, the device to fix a battery of present invention has low cost and friendly use.

6 Claims, 3 Drawing Sheets

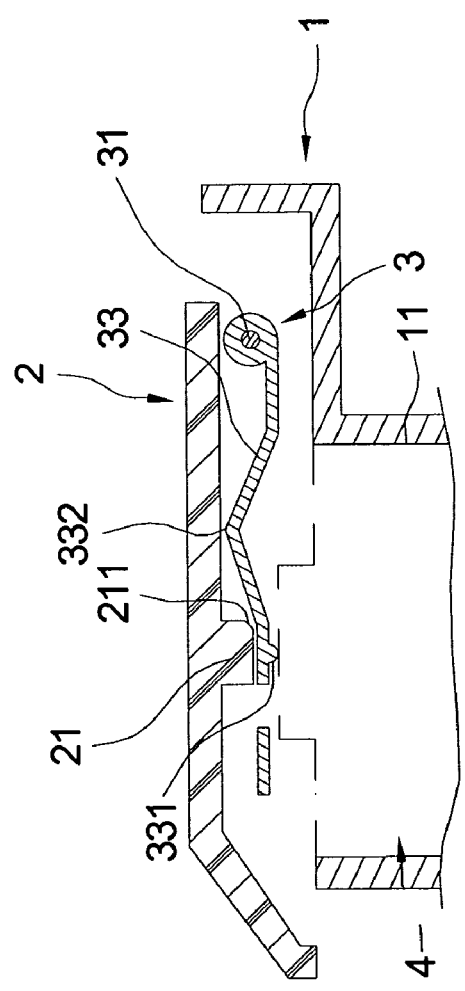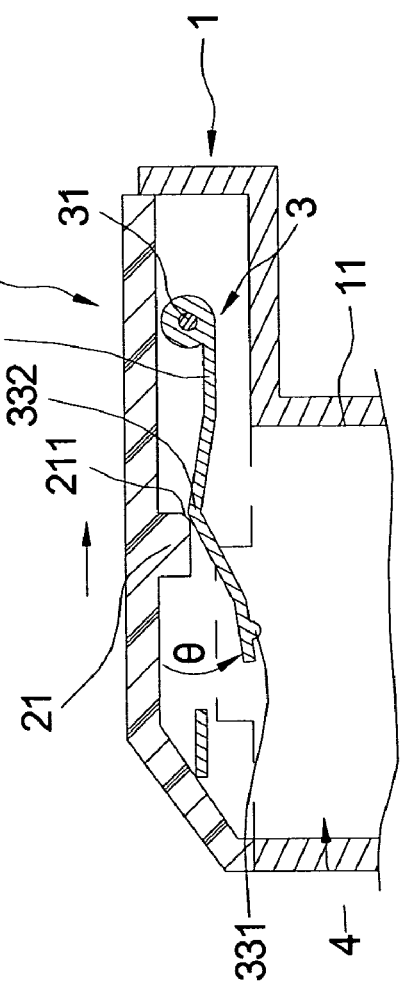
FIG 3A
FIG 3B

BATTERY SECURITY DEVICE

BACKGROUND OF THE INVENTION

1. Field of the Invention

The present invention relates to a battery security device, and particularly relates to a battery security device for avoiding power failure caused of the battery is shook.

2. Background of the Invention

A conventional device to fix the battery provides electrical connection via resilient contacts touching two opposite ends of the battery. Due to the different length of each battery, the pressure stroke between the battery and the resilient contacts will vary thereby. When the length of the battery is short, the resilient contacts suddenly come off the battery due to shakes causes power failure.

To avoid power failure mentioned above, an additional sponge is applied in the battery base in order to increase the pressure stroke for touching the resilient contact. Referring to FIG. 1, a conventional battery device includes a battery base 1a, a holder 2a, a cover 3a, a lower resilient contact 4a, an upper resilient contact 5a and a sponge 6a. The battery base 1a connects to a bottom of the holder 2a. The holder 2a contains a battery 7a therein. The cover 3a connects to a top of the holder 2a. The lower resilient contact 4a connects to the battery base 1a, and the upper resilient contact 5a pivots to the holder 2a. The lower and upper resilient contacts 4a, 5a abut against the electrodes on the bottom and top of the battery 7a respectively for electronic connection. The sponge 6a is arranged between the battery base 1a and the lower resilient contact 4a to provide an upward pressure stroke, so as to avoid the power failure caused of the lower or upper resilient contact 5a, 4a come off from the battery 7a due to the shake momentum.

However, the cover 3a is difficult to cover because of the location of the sponge 6a. And the arrangement of the sponge 6a increases steps of production and cost.

Hence, an improvement over the prior art is required to overcome the disadvantages thereof.

SUMMARY OF THE INVENTION

The primary object of the invention is therefore to specify a battery security device can increase a pressure stroke of an elastic arm, to avoid power failure caused of the shake of the battery. In addition, the strength to cover the device will not increase, and no additional elements will be applied for easy usage and low cost.

According to the invention, the object is achieved to provide a battery security device includes a holder, a cover and at least one flexible plate. The holder contains the battery. The cover slips to set on the holder and has at least one raised lump to press the flexible plate. The flexible plate is set between the holder and the cover and has at least one elastic arm. The elastic arm has a stressed portion and at least one contact portion. When the cover slips to set on the holder, the raised lump presses down the stressed portion to increase the pressure of the elastic arm for avoiding power failure caused of the battery be shook. Further the device to fix a battery does not increase the force of setting the cover and not need any other component. To sum up, the device to fix a battery of present invention has low cost and friendly use.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

FIG. 3A is a perspective view of the battery security device according to the present invention while in use; and FIG. 3B is a perspective view of the battery security device according to the present invention while in use.

DETAILED DESCRIPTION OF THE EMBODIMENTS

Figure 1:
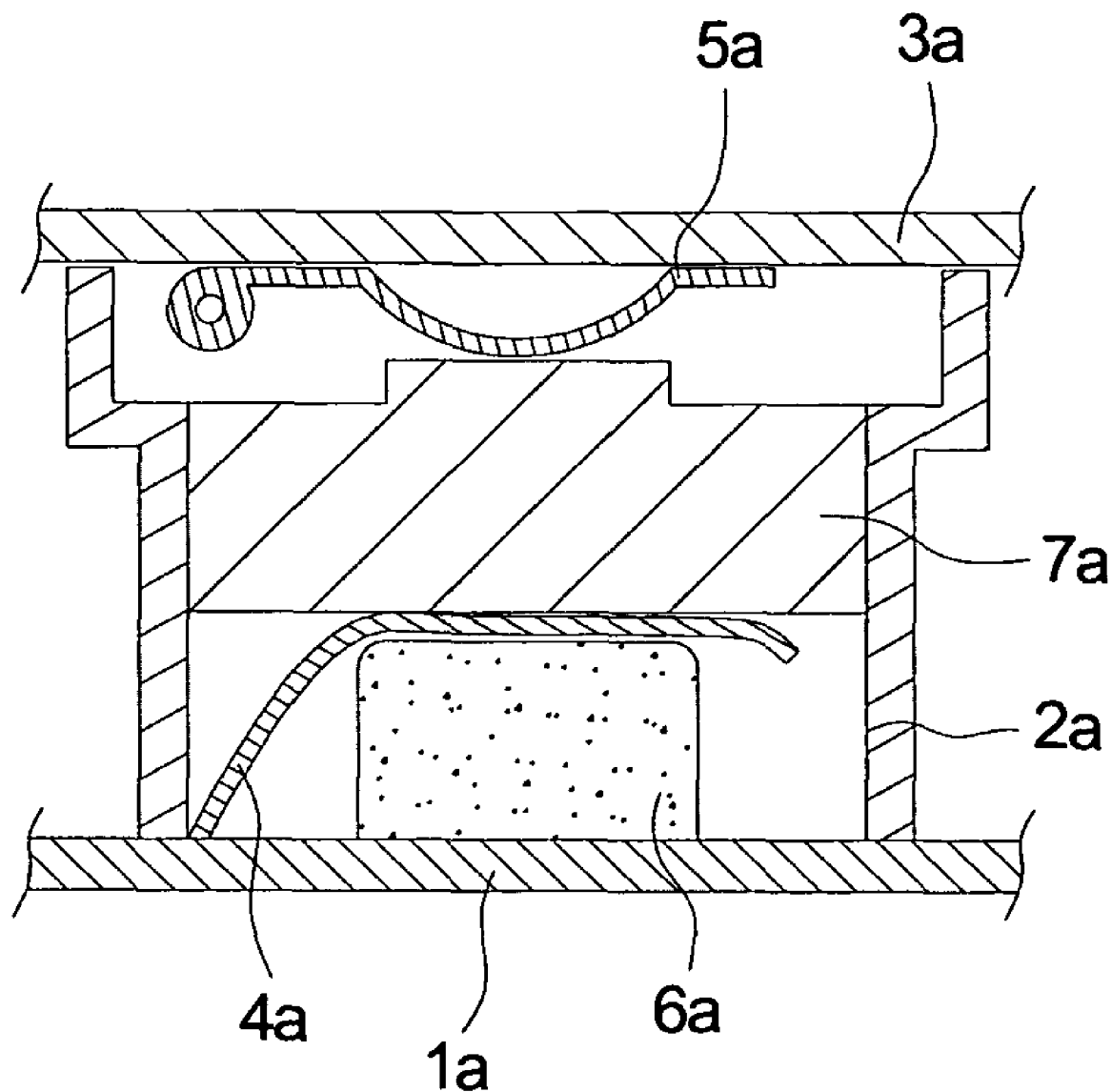
FIG. 1 is a perspective view of a conventional battery device.
Figure 2:
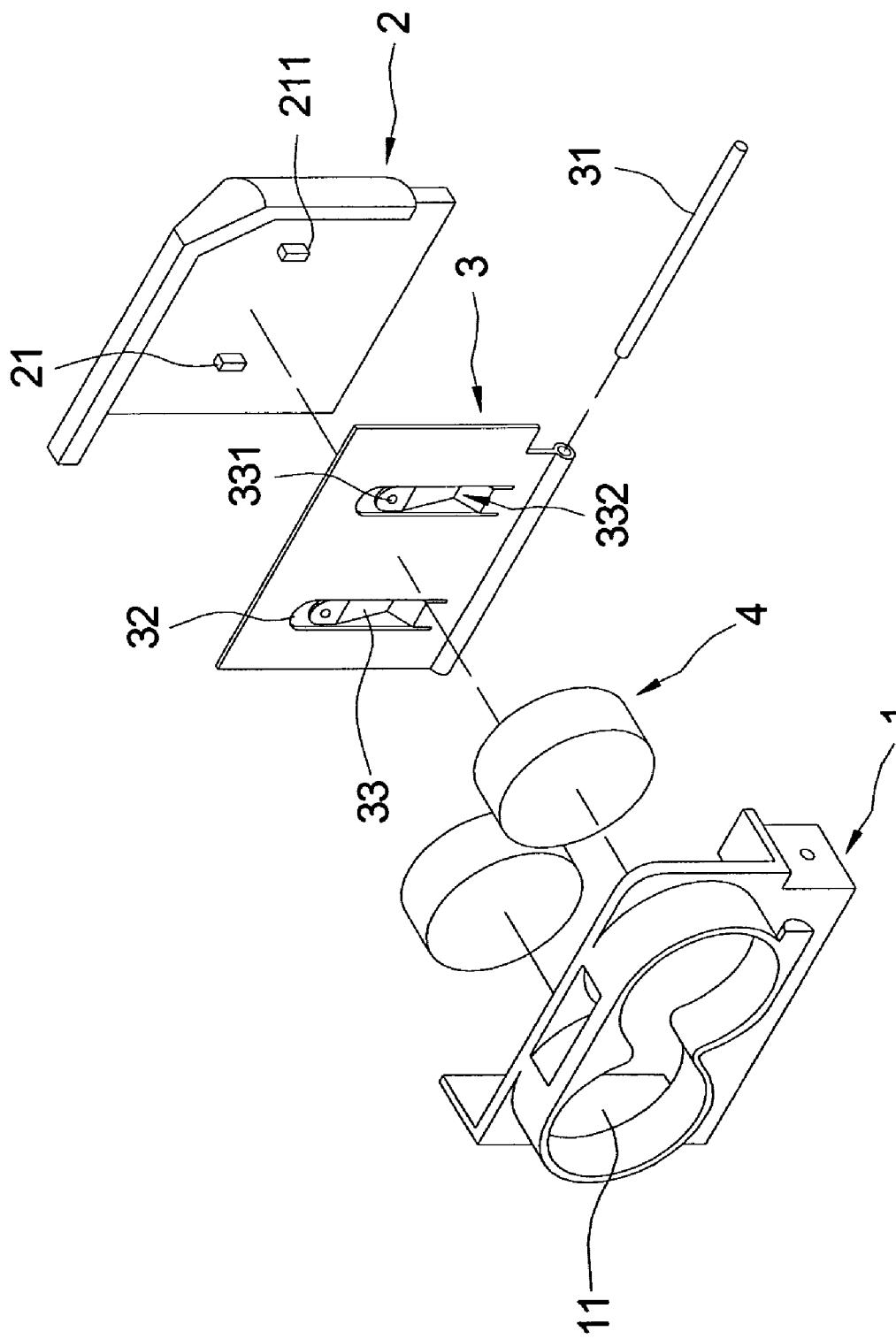
FIG. 2 is a decomposition view of a battery security device according to the present invention.

Referring in FIGS. 2, 3A and 3B, a battery security device according to the present invention includes a holder 1, a cover 2 and at least one flexible plate 3.

The holder 1 is made of insulation materials. The holder 1 has a containing cavity 11 and two slots communicated with two opposite ends of the containing cavity 11. The holder 1 is connected to a battery base (not shown) via a bottom thereof. Inside the containing cavity 11, there are two batteries 4, which electrically connect to the battery base via electrodes (not shown) thereof.

The cover 2 is slipped on the holder 1 and has two raised lumps 21, which are rectangular. The two raised lumps 21 and the cover 2 are made integrally in one piece. Each of the raised lumps 21 includes a push portion 211 arranged at a bottom thereof and being slant. The cover 2 retains against the flexible plate 3 via the push portion 211s of the raised lumps 21. In addition, the raised lump 21 can be rectangular, square, elliptical, round or polygonal.

The flexible plate 3 is arranged between the holder 1 and the cover 2, and connects to the holder 1 via a pivot portion 31 for touching the tops of the two batteries 3 by rotations.

The flexible plate 3 has two openings 32 punched thereof and being elongation-shaped, and further has two elastic arms 33 located in the openings 32 respectively. Each of the elastic arms 33 has a free end, which extends forward a cover-lip-in direction for free wing, and another end connects to the flexible plate 3. Each of the elastic arms 33 has a contact portion 331 disposed at the free end and projecting forward the holder 1. The contact portions 331 electrically connect with the electrodes on the tops of the batteries 4.

After each of the elastic arms 33 is folded to form a pressed portion 332, the pressed portion 332 can project forward the cover 2 and abut against the push portion 211 of the raised lump 21 of the cover 2. The elastic arm 33 can extend into the containing cavity 11 thereby, so as to increase the pressure stroke between the contact portion 331 and the battery 4. Therefore, the battery security device is provided.

When the battery security device is in use: two batteries 4 are arranged in the containing cavity 11 of the holder 1, and the flexible plate 3 to let the contact portions 331 touch the electrodes of the batteries 4 for electrical connection. The cover 2 is slipped on the holder 1 for assembly. At the same time, the push portions 211 of the raised lumps 21 force the pressed portions 332 respectively, thus, the free end of each elastic arm 33 extends into the containing cavity 11. An angle θ between the elastic arms 33 and the cover 2 increases, the pressure stroke of the contact portions 331 to the batteries 4 increases, either.

The battery security device according to the present invention can increase the pressure stroke of the elastic arm, to avoid power failure caused of the shake of the battery. In addition, the strength to cover the device will not increase, and no additional elements will be applied for easy usage and low cost.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A battery security device, comprising:
    a holder having a containing cavity;
    a cover slidably dis-mountable from the holder and having two raised lumps protruding into the containing cavity; and
    at least one flexible planar plate disposed between the holder and the cover, being pivotally connected to the holder, and having two elastic arms, each of the elastic arms has a pressed portion and at least one contact portion, wherein the pressed portions project toward the cover, each of the raised lumps of the cover abut against a respective pressed portion, and each contact portion is radially displaced relative to the flexible planar plate into the containing cavity to contact an electrode of a respective battery disposed therein responsive to a force occasioned by a respective raised lump of the cover abutting against the pressed portion of a corresponding elastic arm.

2. The battery security device as claimed in claim 1, wherein the raised lumps and the cover are made integrally in one piece.

3. The battery security device as claimed in claim 1, wherein the raised lumps are rectangular, square, elliptical, round or polygonal.

4. The battery security device as claimed in claim 1, wherein each raised lump includes a push portion, which is capable of applying force on a respective contact portion.

5. The battery security device as claimed in claim 1, wherein the flexible planar plate has two openings punched therethrough, each elastic arm is located in a respective opening and has an end connected to the flexible planar plate.

6. The battery security device as claimed in claim 1, wherein each elastic arm is folded to form the pressed portion.

* * * * *